UNITED STATES PATENT OFFICE.

ERNST VOETTER, OF BOCKUM, NEAR CREFELD, GERMANY.

PROCESS OF MAKING SULFUR DYES.

1,200,055.  Specification of Letters Patent.  Patented Oct. 3, 1916.

No Drawing.   Application filed February 26, 1907.  Serial No. 359,529.

*To all whom it may concern:*

Be it known that I, ERNST VOETTER, chemist, a subject of the King of Wurttemberg, residing at 2 Markt, Bockum, near Crefeld, Kingdom of Prussia, German Empire, have invented new and useful Improvements in Processes of Making Sulfur Dyes, of which the following is a specification.

This invention relates to the manufacture of sulfur dyes.

It has been observed, that a large number of precipitated sulfur dyes, when treated with the suitable quantity of sulfid of sodium are converted into new compounds in which free sulfid of alkali cannot be detected; for example they do not blacken polished silver plate. Therefore only such amounts of sulfid are added as can enter into chemical combination with the sulfur dyes. This quantity of sulfid is insufficient for producing the liquid state and the dyes remain totally undissolved.

Most of the sulfur dyes are suitable for this process, especially the dyestuffs of diphenylamin, indophenols, m-diamins and generally derivatives and substitution products of the named groups. As chiefly suitable for carrying out my process I have found for instance the various brands of the following sulfur dyes in precipitated state:—auronal-black, sulfur-black (Actiengesellschaft für Anilinfabrikation, Berlin), thiophenol - black (Gesellschaft für Chemische Industrie in Basel), immedial-black, katigen-black, Vidal-black, immedialindon, auronal-green, katigen-brown, auronal-yellow.

It is evident, that instead of the dry dyestuffs the pressed cakes in wet state may also be used.

The conditions for carrying out the reaction may vary and will be ascertained in the special cases by those skilled in the art by means of experiments. Generally a rise of temperature and an evolution of ammonia will take place.

The new sulfur dyes have not only an increased dyeing power but dissolve more easily, requiring, therefore, a considerably smaller quantity of sulfid of sodium and dye more evenly than the parent compounds. Of still greater importance is however the unexpected property of my new sulfur dyes that they do not blacken, when combined with diluted caustic alkalis or alkaline salts and the usual additions, the copper printing rollers. On account of this property the new sulfur dyes are particularly adapted for printing. The production of the new dye-stuffs is very simple and cheap so that the new sulfur dyes show a considerable technical progress in printing and dyeing with sulfur dyes.

The new sulfur dyes are decomposed by means of acids and concentrated solutions of caustic alkalis mostly at an ordinary temperature, giving then the well known reaction of sulfids, for instance blackening lead paper, whereas diluted solutions of caustic alkalis and alkaline salts, as for instance carbonate of soda, cause the said decomposition only at a relatively high temperature as used in the steaming process. The said formation of sulfid of alkali during the steaming process is probably the reason for the fixation of the new dyes. By the addition of sulfur to the new dyes the intensity and fastness of the colors may be increased.

The new dyes may be prepared in the following manner: 100 parts of sulfur-black T extra concentrated (prepared by the Actiengesellschaft für Anilinfabrikation according to United States Patent No. 655,659 by boiling dinitrophenol (4:2:1) with polysulfid of sodium and precipitating the dyestuff) are mixed with a concentrated solution of 30–35 parts of sulfid of sodium until a uniform mixture is obtained. With the development of ammonia the temperature rises, the volume of the dyes being at the same time increased; some time afterward the presence of alkaline sulfid cannot be detected by the usual reactions, *i. e.* a copper or silver plate will not be blackened, because the sulfid of alkali, producing with the above metals black sulfur compounds, has disappeared.

The product obtained in the manner described may be used immediately or after drying for dyeing purposes. For the printing operation the color paste is mixed with the usual additions for instance 200 parts burnt starch and diluted solutions of caustic alkalis or a salt of alkaline reaction, for instance 120 parts carbonate of sodium, and the whole brought with the necessary quantity of water to 1000 parts; after printing dry and develop by steam as free from air as possible.

The sulfur dye is a thick paste, unable to pass a viscosimeter.

What I claim as my invention, and desire to secure by Letters Patent, is:—

1. Process for making sulfur dyes in the form of pastes which consists in adding alkaline sulfid to precipitated sulfur dyes in such amounts that it will all combine chemically with the said dye, leaving no uncombined or free alkaline sulfid.

2. Pastes of sulfur dyes derived from isolated sulfur dyes by adding to them alkaline sulfid in such amounts that it will all combine chemically with said dyes, the new dyes being undecomposed by water, diluted caustic alkalis or alkaline salts at ordinary temperature, leaving metals unblackened even in the presence of caustic alkalis or alkaline salts at ordinary temperature, but being decomposed by acids under evolution of sulfureted hydrogen, being also decomposed if printed on textile fibers in admixture with caustic alkalis or alkaline salts, by the action of steam under simultaneous fixation of the dye on the fiber and reappearance of free uncombined alkaline sulfid.

In witness whereof I have hereunto signed my name this 13th day of February, 1907, in the presence of two subscribing witnesses.

ERNST VOETTER.

Witnesses:
　MARGARET WALLACE,
　W. BRUCE WALLACE.